United States Patent
Frenne et al.

(10) Patent No.: US 12,192,001 B2
(45) Date of Patent: Jan. 7, 2025

(54) ROBUSTNESS FOR CONTROL CHANNEL

(71) Applicant: Telefonaktiebolaget LM Ericsson (publ), Stockholm (SE)

(72) Inventors: Mattias Frenne, Uppsala (SE); Sebastian Faxér, Stockholm (SE); Yufei Blankenship, Kildeer, IL (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 788 days.

(21) Appl. No.: 17/279,656

(22) PCT Filed: Sep. 19, 2019

(86) PCT No.: PCT/EP2019/075223
§ 371 (c)(1),
(2) Date: Mar. 25, 2021

(87) PCT Pub. No.: WO2020/064512
PCT Pub. Date: Apr. 2, 2020

(65) Prior Publication Data
US 2022/0038207 A1 Feb. 3, 2022

Related U.S. Application Data

(60) Provisional application No. 62/737,764, filed on Sep. 27, 2018.

(51) Int. Cl.
*H04L 1/08* (2006.01)
*H04L 5/00* (2006.01)

(52) U.S. Cl.
CPC ............. *H04L 1/08* (2013.01); *H04L 5/0053* (2013.01)

(58) Field of Classification Search
CPC ....... H04L 5/0053; H04L 1/08; H04L 1/0045; H04L 1/0041
See application file for complete search history.

(56) References Cited

U.S. PATENT DOCUMENTS 9,924,502 B2 * 3/2018 Choi ................. H04W 72/23
2018/0279360 A1 * 9/2018 Park ................. H04W 72/23

FOREIGN PATENT DOCUMENTS

WO WO-2018228487 A1 * 12/2018 ........... H04L 1/1635

OTHER PUBLICATIONS

CATT: Discussion on enhanced PDCCH for NR URLLC 3GPP Draft; R1-1801750, 3rd Generation Partnership Project (3GPP), Mobile Competence Center; 650, Route Des Lucioles; F-06921 Sophia Antipolis Cedex; France RAN WG1, No. Athens, Greece, Feb. 26, 2018-Mar. 2, 2018 Feb. 17, 2018 XP051297731 (Year: 2018).*

(Continued)

*Primary Examiner* — Chi H Pham
*Assistant Examiner* — Samuel Dilan Rutnam
(74) *Attorney, Agent, or Firm* — Weisberg I.P. Law, P.A.

(57) ABSTRACT

A method, network node and wireless device for transmitting and decoding repeated physical downlink control channel (PDCCH) messages are disclosed. According to one embodiment a method implemented in a wireless device (WD) includes receiving multiple transmissions of a PDCCH message, each of the multiple transmissions of the PDDCH message being repeated in a repetition set. The method further includes monitoring the multiple received PDCCH transmissions to obtain scheduling information for a physical uplink shared channel (PUSCH) transmission or a physical downlink shared channel (PDSCH) reception.

24 Claims, 9 Drawing Sheets

(56) References Cited

OTHER PUBLICATIONS

VIVO: Discussion on PDCCH Repetitions for URLCC 3GPP Draft; R1-1803847_Discussion On PDCCH Repetition for URLCC, 3rd Generation Partnership Project (3GPP), Mobile Competence Center; 650, Route Des Lucioles; F-06921 Sophia Antipolis Cedex; France RAN WG1, No. Sanya, China Apr. 16, 2018-Apr. 20, 2018 XP051413029 (Year: 2018).*
International Search Report and Written Opinion dated Jan. 8, 2020 for International Application No. PCT/EP2019/075223 filed on Sep. 19, 2019, consisting of 15-pages.
3GPP TSG RAN WG1 Meeting Ad-Hoc Meeting 1901 R1-1900728; Title: On multi-TRP and multi-panel; Source: Ericsson; Agenda Item: 7.2.8.2; Document for: Discussion and Decision; Date and Location: Jan. 21-25, 2019, Taipei, Taiwan, consisting of 9-pages.
3GPP TSG RAN WG1 Meeting #92bis R1-1805063; Title: Necessity of PDCCH repetition; Source: NTT Docomo, Inc.; Agenda Item: 7.2.3; Document for: Discussion and Decision; Date and Location: Apr. 16-20, 2018, Sanya, China, consisting of 6-pages.
3GPP TSG RAN WG1 Meeting #92bis R1-1803847; Title: Discussion on PDCCH repetition for URLLC; Source: vivo; Agenda Item: 7.2.3; Document for: Discussion and Decision; Date and Location: Apr. 16-20, 2018, Sanya, China, consisting of 6-pages.
3GPP TSG RAN WG1 Meeting #92 R1-1801750; Title: Discussion on enhanced PDCCH for NR URLLC; Source: CATT; Agenda Item: 7.2.3; Document for: Discussion and Decision; Date and Location: Feb. 26-Mar. 2, 2018 Athens, Greece, consisting of 4-pages.
3GPP TS 38.213 V1.0.2; 3rd Generation Partnership Project; Technical Specification Group Radio Access Network; NR; Physical layer procedures for control (Release 15); Oct. 2017, consisting of 21-pages.
3GPP TS 38.331 V15.1.0; 3rd Generation Partnership Project; Technical Specification Group Radio Access Network; NR; Radio Resource Control (RRC) protocol specification (Release 15); Mar. 2018, consisting of 268-pages.
3GPP TS 38.211 V15.6.0; 3rd Generation Partnership Project; Technical Specification Group Radio Access Network; NR; Physical channels and modulation (Release 15); Jun. 2019, consisting of 97-pages.

\* cited by examiner

ROBUSTNESS FOR CONTROL CHANNEL

CROSS-REFERENCE TO RELATED APPLICATIONS

This application is a Submission Under 35 U.S.C. § 371 for U.S. National Stage Patent Application of International Application No.: PCT/EP2019/075223, filed Sep. 29, 2019 entitled "ROBUSTNESS FOR CONTROL CHANNEL," which claims priority to U.S. Provisional Application No. 62/737,764, filed Sep. 27, 2018, entitled "ROBUSTNESS FOR CONTROL CHANNEL," the entireties of both of which are incorporated herein by reference.

FIELD

The present disclosure relates to wireless communications, and in particular, to increasing robustness of a control channel.

BACKGROUND

The $3^{rd}$ Generation Partnership Project (3GPP) next generation mobile wireless communication system standards, sometimes referred to as Fifth Generation (5G) or new radio (NR), support a diverse set of use cases, such as enhanced mobile broadband (eMBB), ultra reliable and low latency communications (URLLC), machine-type of communication (MTC)) and a diverse set of deployment scenarios. The latter includes deployment at both low frequencies (100s of MHz), similar to Long Term Evolution (LTE) today, and very high frequencies (mm waves in the tens of GHz).

Similar to LTE, NR uses Orthogonal Frequency Division Multiplexing (OFDM) in the downlink (i.e., from a network node or base station (gNB for NR, eNB for LTE), to a wireless device (WD)). The basic NR physical resource over an antenna port can be seen as a time-frequency grid as illustrated in FIG. 1, where a resource block (RB) in a 14-symbol slot is shown. A resource block corresponds to 12 contiguous subcarriers in the frequency domain. Resource blocks are numbered in the frequency domain, starting with 0 from one end of the system bandwidth. Each resource element corresponds to one OFDM subcarrier during one OFDM symbol interval.

Different subcarrier spacing values are supported in NR. The supported subcarrier spacing values (also referred to as different numerologies) are given by $\Delta f=(15 \times 2^{\alpha})$ kHz where $\alpha \in (0,1,2,3,4)$. $\Delta f=15$ kHz is the basic (or reference) subcarrier spacing that is also used in LTE.

In the time domain, downlink and uplink transmissions in NR will be organized into equally-sized subframes of 1 ms each, similar to LTE. A subframe is further divided into multiple slots of equal duration. The slot length for subcarrier spacing $\Delta f=(15 \times 2^{\alpha})$ kHz is $1/2^{\alpha}$ ms. There is only one slot per subframe at $\Delta f=15$ kHz and a slot consists of 14 OFDM symbols.

Downlink transmissions are dynamically scheduled, i.e., in each slot, the network node transmits downlink control information (DCI) about to which WD data is to be transmitted and on which resource blocks in the current downlink slot the data is transmitted. This control information is typically transmitted in the first one or two OFDM symbols in each slot in NR. The control information is carried on the Physical Downlink Control Channel (PDCCH) and data is carried on the Physical Downlink Shared Channel (PDSCH). A WD first detects and decodes the PDCCH and if the PDCCH is decoded successfully, the WD then decodes the corresponding PDSCH based on the decoded control information in the PDCCH.

In addition to the PDCCH and PDSCH, there are also other channels and reference signals transmitted in the downlink.

Uplink data transmissions, carried on Physical Uplink Shared Channel (PUSCH), are also dynamically scheduled by the gNB by transmitting a DCI. In case of time division duplex (TDD) operation, the DCI (which is transmitted in the downlink (DL) region) always indicates a scheduling offset so that the physical uplink shared channel (PUSCH) is transmitted in a slot in the uplink (UL) region.

The information element (IE) ControlResourceSet is used to configure a time/frequency control resource set (CORE-SET), which is necessary for the WD to be able to search for downlink control information. (See Technical Standard (TS) 38.331 of the Third Generation Partnership Project (3GPP) Technical Standards. Below is an excerpt from TS 38.331, describing the pseudo code that is transmitted from the network to the WD in the radio resource control (RRC) message, in order to configure the CORESET. Note that this configuration does not specify in which symbols the WD should search for the control channel. The WD merely configures the frequency domain resources and other parameters. To be able to perform the search of control information, the SearchSpace IE must also be configured, which contains the time domain information, e.g., for which symbols the WD shall attempt to decode a control channel and with which periodicity. The SearchSpace ID is also described in TS 38.331 and captured further below.

```
-- ASN1START
-- TAG-CONTROLRESOURCESET-START
ControlResourceSet ::=                SEQUENCE {
    controlResourceSetId              ControlResourceSetId,
    frequencyDomainResources          BIT STRING (SIZE (45)),
    duration                          INTEGER
    (1..maxCoReSetDuration),
    cce-REG-MappingType               CHOICE {
        interleaved
        SEQUENCE {
            reg-BundleSize
            ENUMERATED {n2, n3, n6},
            interleaverSize
            ENUMERATED {n2, n3, n6},
            shiftIndex
            INTEGER(0..maxNrofPhysicalResourceBlocks-1)
            OPTIONAL    -- Need S
        },
        nonInterleaved                NULL
```

```
            },
    precoderGranularity                           ENUMERATED
{sameAsREG-bundle, allContiguousRBs},
    tci-StatesPDCCH-ToAddList                     SEQUENCE(SIZE
(1..maxNrofTCI-StatesPDCCH)) OF TCI-StateId      OPTIONAL,  --
Need N
        tci-StatesPDCCH-ToReleaseList             SEQUENCE(SIZE
(1..maxNrofTCI-StatesPDCCH)) OF TCI-StateId      OPTIONAL,  --
Need N
tci-PresentInDCI                                  ENUMERATED {enabled}
    OPTIONAL,  -- Need S
    pdcch-DMRS-ScramblingID                       INTEGER (0..65535)
    OPTIONAL,  -- Need S
    ...
}
-- TAG-CONTROLRESOURCESET-STOP
-- ASN1STOP
```

The following table explains the different fields that are part of the Control Resource Set.

| ControlResourceSet field descriptions |
| --- |
| cce-REG-MappingType<br>Mapping of Control Channel Elements (CCE) to Resource Element Groups (REG). Corresponds to L1 parameter 'CORESET-CCE-REG-mapping-type' (see TS 38.211 Sections 7.3.2.2 and 7.4.1.3.2).<br>controlResourceSetId<br>Corresponds to the layer 1 (L1) parameter 'CORESET-ID'. Value 0 identifies the common CORESET configured in MIB and in ServingCellConfigCommon. Values 1..maxNrofControlResourceSets-1 identify CORESETs configured by dedicated signalling. The controlResourceSetId is unique among the BWPs of a ServingCell.<br>duration<br>Contiguous time duration of the CORESET in number of symbols. Corresponds to the L1 parameter 'CORESET-time-duration' (see TS 38.211, section 7.3.2.2FFS_Section)<br>frequencyDomainResources<br>Frequency domain resources for the CORESET. Each bit corresponds a group of 6 RBs, with grouping starting from PRB 0, which is fully contained in the bandwidth part within which the CORESET is configured. The most significant bit corresponds to the group of lowest frequency which is fully contained in the bandwidth part within which the CORESET is configured, each next subsequent lower significance bit corresponds to the next lowest frequency group fully contained within the bandwidth part within which the CORESET is configured, if any. Bits corresponding to a group not fully contained within the bandwidth part within which the CORESET is configured are set to zero. Corresponds to L1 parameter 'CORESET-freq-dom' (see TS 38.211, section 7.3.2.2).<br>interleaverSize<br>Corresponds to the L1 parameter 'CORESET-interleaver-size' (see TSs 38.211 and 38.213, section FFS_Section).<br>pdcch-DMRS-ScramblingID<br>PDCCH demodulation reference symbol (DMRS) scrambling initialization, this field corresponds to the L1 parameter 'PDCCH-DMRS-Scrambling-ID' (see TS 38.211, section 7.4.1). When the field is absent, the WD applies the value of the physCellId configured for this serving cell.<br>precoderGranularity<br>Precoder granularity in frequency domain. Corresponds to L1 parameter 'CORESET-precoder-granularity' (see TS 38.211, sections 7.3.2.2 and 7.4.1.3.2).<br>reg-BundleSize<br>Resource Element Groups (REGs) can be bundled to create REG bundles. This parameter defines the size of such bundles. Corresponds to the L1 parameter 'CORESET-REG-bundle-size' (see TS 38.211, section FFS_Section).<br>shiftIndex<br>Corresponds to the L1 parameter 'CORESET-shift-index'. When the field is absent the WD applies the value of the physCellId configured for this serving cell (see TS 38.211, section 7.3.2.2).<br>tci-PresentInDCI<br>If at least spatial QCL is configured/indicated, this field indicates if TCI field is present or not present in DL-related DCI. When the field is absent the WD considers the TCI to be absent/disabled. Corresponds to the L1 parameter 'TCI-PresentInDCI' (see TS 38,213, section 5.1.5).<br>tci-StatesPDCCH-ToAddList, tci-StatesPDCCH-ToReleaseList<br>A subset of the TCI states defined in TCI-States used for providing QCL relationships between the DL RS(s) in one RS Set (TCI-State) and the PDCCH DMRS ports. Corresponds to L1 parameter 'TCI-StatesPDCCH' (see TS 38.213, section10.). The network configures at most maxNrofTCI-StatesPDCCH entries. |

The 1E SearchSpace defines how and where to search for PDCCH candidates in the time dimension, e.g., periodicity. Each search space is associated with one ControlResourceSet.

```
-- ASN1START
-- TAG-SEARCHSPACE-START
SearchSpace ::=                         SEQUENCE {
    searchSpaceId                           SearchSpaceId,
    controlResourceSetId                    ControlResourceSetId
        OPTIONAL, -- Cond SetupOnly
    monitoringSlotPeriodicityAndOffset      CHOICE {
        sl1
            NULL,
        sl2
            INTEGER (0..1),
        sl4
            INTEGER (0..3),
        sl5                                 INTEGER
(0..4),
        sl8
INTEGER (0..7),
        sl10                                INTEGER
(0..9),
        sl16                                INTEGER
(0..15),
        sl20                                INTEGER
(0..19),
        sl40                                INTEGER
(0..39),
        sl80                                INTEGER
(0..79),
        sl160                               INTEGER
(0..159),
        sl320                               INTEGER
(0..319),
        sl640                               INTEGER
(0..639),
        sl1280                              INTEGER
(0..1279),
        sl2560                              INTEGER
(0..2559)
    }
                                        OPTIONAL, -- Cond Setup
    duration                            INTEGER
(2..2559)
        OPTIONAL, -- Need R
    monitoringSymbolsWithinSlot         BIT STRING (SIZE (14))
        OPTIONAL, -- Cond Setup
    nrofCandidates                      SEQUENCE {
        aggregationLevel1                   ENUMERATED
{n0, n1, n2, n3, n4, n5, n6, n8},
        aggregationLevel2                   ENUMERATED
{n0, n1, n2, n3, n4, n5, n6, n8},
        aggregationLevel4                   ENUMERATED
{n0, n1, n2, n3, n4, n5, n6, n8},
        aggregationLevel8                   ENUMERATED
{n0, n1, n2, n3, n4, n5, n6, n8},
        aggregationLevel16                  ENUMERATED
{n0, n1, n2, n3, n4, n5, n6, n8}
    }
                                        OPTIONAL, -- Cond Setup
    searchSpaceType                     CHOICE {
        common
        SEQUENCE {
            dci-Format0-0-AndFormat1-0
            SEQUENCE {
                ...
            }
                                        OPTIONAL, -- Need R
            dci-Format2-0
            SEQUENCE {
                nrofCandidates-SFI
                SEQUENCE {
                    aggregationLevel1
                    ENUMERATED {n1, n2}
                        OPTIONAL, -- Need R
                    aggregationLevel2
                    ENUMERATED {n1, n2}
                        OPTIONAL, -- Need R
                    aggregationLevel4
                    ENUMERATED {n1, n2}
                        OPTIONAL, -- Need R
                    aggregationLevel8
                    ENUMERATED {n1, n2}
                        OPTIONAL, -- Need R
                    aggregationLevel16
                    ENUMERATED {n1, n2}
                        OPTIONAL -- Need R
                },
                ...
            }
                                        OPTIONAL, -- Need R
            dci-Format2-1
            SEQUENCE {
                ...
            }
                                        OPTIONAL, -- Need R
            dci-Format2-2
            SEQUENCE f
                ...
            }
                                        OPTIONAL, -- Need R
            dci-Format2-3
            SEQUENCE {
                monitoringPeriodicity
                ENUMERATED{n1, n2, n4, n5, n8, n10, n16, n20 }
                    OPTIONAL, -- Cond Setup
                nrofPDCCH-Candidates
                ENUMERATED {n1, n2},
            }
                                        OPTIONAL -- Need R
        },
        ue-Specific
        SEQUENCE {
            dci-Formats
            ENUMERATED {formats0-0-And-1-0, formats0-1-And-1-1},
            ...
        }
    }
                                        OPTIONAL -- Cond Setup
}
```

In LTE and NR, reference signals used for channel estimation are equivalently denoted as antenna ports. Hence, the WD can estimate the channel from one antenna port by using the associated reference signal (RS). A certain data or control transmission can then be associated with an antenna port, which is the same as saying that the WD uses the RS for that antenna port to estimate the channel used to demodulate the associated control or data channel. It can also be said that the data or control channel is transmitted using that antenna port.

In LTE and NR, the concept of quasi-co location is used in order to improve the channel estimation performance when demodulating control or data channels. The concept relies on the WD being able to estimate long term channel properties from one reference signal in order to tune its channel estimation algorithm. For instance, the average channel delay spread can be estimated using one antenna port and used when demodulating a data channel transmitted using another antenna port. If this is allowed, it may be specified that the first and second antenna port are quasi co-located (QCL) with respect to average channel delay spread.

Hence, as used in the 3GPP LTE and NR specifications, two antenna ports are "quasi co-located" if the large-scale channel properties of the channel over which a symbol on one antenna port is conveyed or can be inferred from the channel over which a symbol on the other antenna port is conveyed. The large-scale channel properties preferably include one or more of delay spread, Doppler spread, Doppler shift, average gain, and average delay.

In addition, or alternatively, the large-scale channel properties can include one or more of received power for each port, received timing (i.e., timing of a first significant channel tap), a number of significant channel taps, and frequency shift. By performing channel estimation algorithm tuning based on the RSs corresponding to the quasi co-located antenna ports, a quality of the channel estimation is substantially improved.

There have been discussions among 3GPP participants about the introduction of quasi co-location (QCL) for spatial properties of the channel on top of those QCL parameters use for LTE. By complementing the existing QCL framework with new QCL parameters that depend on spatial channel properties, a WD is allowed to perform spatial processing across different signal types without violating the rule that a WD is not to use measurements from one reference signal to assist in the reception or processing of another signal unless explicitly specified.

Examples of such spatial processing are analog receiver beamforming, and channel estimation using spatial processing gain to improve the channel estimate.

Assume communication between three nodes in a network, two alternative transmit (TX) nodes and a receive (RX) node, and consider the following communication scenario:

- A first TX node transmits a first set of reference signals (RS) from one or multiple transmit antenna ports;
- A RX node receives the transmitted reference signals using one or multiple receive antenna ports and determines or estimates, based on the received first set of transmitted RS, one or more parameters capturing a time, frequency and spatial property of the channel;
- A second TX node transmits a second set of reference signals (RS) from one or multiple transmit antenna ports;
- A RX node receives the transmitted reference signals using one or multiple receive antenna ports and determines or estimates, based on the received second set of transmitted RS, one or more parameters capturing a time, frequency and spatial property of the channel;
- A PDCCH is transmitted from the first node and indicates either the first or the second set of RS as the reference for a PDSCH transmission. Assume in this example that the second set is signaled in the PDCCH;
- The RX node receives an indication that the PDSCH demodulation reference signals (DMRS) transmitted from one or multiple transmit antenna ports are quasi co-located (QCL) with the said second RS, where the QCL is given with respect to the one or more parameters capturing a time and frequency and spatial property of the channel;
- The TX node transmits the PDSCH from the second node; and
- The RX node utilizes one or more of the determined parameters capturing a spatial property of the channel that is based on the second set of RS, to assist in the reception of the PDSCH.

In other words, the RX node, typically a WD, can use the same channel estimation filter and RX beamforming weights to receive the PDSCH and associated DMRS as used when the WD receives a second signal (for example, a measurement signal, e.g., channel state information reference signal (CSI-RS)) if the PDSCH DMRS is QCL with the second RS with respect to spatial parameters.

Spatial parameters include but are not limited to angle of arrival, angular spread or spatial correlation, spatial correlation matrix on the RX side or on the TX side.

In NR, there have been discussions concerning configuring each CORESET with an independent source RS for QCL purpose. The mechanism to do this is to preconfigure up to 128 transmission configuration indicator (TCI) states and each state contains one or two RSs as source for the QCL. Hence, a CORESET is configured for a TCI state.

In NR, PDCCH transmissions are self-contained and one-shot, implying that if a WD misses a PDCCH, the scheduled PDSCH is not received, or, the scheduled PUSCH is never transmitted. Thus, there could be issues meeting reliability and latency requirements.

SUMMARY

Some embodiments advantageously provide methods, network nodes, and wireless devices for increasing robustness of a control channel as compared with known control channel implementation solutions. To increase robustness for the control channel (PDCCH) with short latency, the control channel transmission is repeated a plurality of times without affecting the start and stop time of the PDSCH. In addition, at least two of the PDCCH repetitions have different source RS for QCL assumptions, allowing for spatial multiplexing diversity by using multiple physically separated transmission points.

According to one aspect, a wireless device (WD) configured to communicate with a network node, the WD comprising processing circuitry configured to: receive multiple transmissions of a physical downlink control channel, PDCCH, message, each of the multiple transmissions of the PDDCH message being repeated in a repetition set; and monitor the multiple received PDCCH message transmissions to obtain scheduling information for a physical uplink shared channel, PUSCH, transmission or a physical downlink shared channel, PDSCH, reception.

According to this aspect, in some embodiments, the processing circuitry is further configured to combine the multiple received PDCCH message transmissions in the repetition set to determine a PDCCH candidate. In some embodiments, each PDCCH message transmission is separately decodable to produce a PDCCH candidate. In some embodiments, the WD is configured with multiple search spaces where there is a repetition association between different search spaces, and wherein a PDCCH candidate in a search space is repeated in another search space to achieve a repetition set. In some embodiments, for a first PDCCH candidate in a first search space, the first PDCCH candidate having a first downlink control information, DCI, there is a corresponding PDCCH candidate in another search space having a same sized DCI as the first PDCCH candidate. In some embodiments, the WD can, for each of a plurality of DCI sizes, combine PDCCH candidates from multiple search spaces to obtain PDCCH detection robustness. In some embodiments, a search space configuration contains multiple identifiers indicating multiple PDCCH candidates, to enable a search of a PDCCH candidate based on the identifiers. In some embodiments, the processing circuitry is further configured to count blind decodes such that a given PDCCH candidate that is repeated is counted as a single monitored PDCCH candidate. In some embodiments, each PDCCH in the repetition set schedules a separate PDSCH or PUSCH. In some embodiments, multiple PDCCHs schedule a same PDSCH or PUSCH to achieve a many-to-one mapping of the PDCCH to the PDSCH or PUSCH. In some embodiments, the processing circuitry is further configured to determine a scheduling offset between a PDSCH and a PUSCH based on an earliest time location at which a PDCCH candidate of the repetition set can be received.

According to another aspect, a method implemented in a wireless device (WD) includes receiving multiple transmissions of a physical downlink control channel, PDCCH, message, each of the multiple transmissions of the PDDCH message being repeated in a repetition set. The method also includes monitoring the multiple received PDCCH message transmissions to obtain scheduling information for a physical uplink shared channel, PUSCH, transmission or a physical downlink shared channel, PDSCH, reception.

According to this aspect, in some embodiments, the method further includes combining the multiple received PDCCH message transmissions in the repetition set to determine a PDCCH candidate. In some embodiments, each PDCCH message transmission is separately decodable to produce a PDCCH candidate. In some embodiments, the method also includes searching multiple search spaces where there is a repetition association between different search spaces, and wherein a PDCCH candidate in a search space is repeated in another search space to achieve a repetition set. In some embodiments, the method further includes searching for a first PDCCH candidate in a first search space, the first PDCCH candidate having a first downlink control information, DCI, there being a corresponding PDCCH candidate in another search space having a same sized DCI as the first PDCCH candidate. In some embodiments, the method further includes combining PDCCH candidates from multiple search spaces to obtain PDCCH detection robustness. In some embodiments, the method further includes searching for a PDCCH candidate based on multiple identifiers in a search space configuration, the multiple identifiers indicating multiple PDCCH candidates. In some embodiments, the method further includes counting blind decodes such that a given PDCCH candidate that is repeated is counted as a single monitored PDCCH candidate. In some embodiments, each PDCCH in the repetition set schedules a separate PDSCH or PUSCH. In some embodiments, multiple PDCCHs schedule a same PDSCH or PUSCH to achieve a many-to-one mapping of the PDCCH to the PDSCH or PUSCH. In some embodiments, the method further includes determining a scheduling offset between a PDSCH and a PUSCH based on an earliest time location at which a PDCCH candidate of the repetition set can be received.

According to another aspect, a network node is configured to communicate with a wireless device (WD). The network node includes processing circuitry configured to configure a physical downlink control channel, PDCCH, message scheduling one of a physical downlink shared channel, PDSCH, and a physical uplink shared channel, PUSCH. The processing circuitry is further configured to transmit the PDCCH message a plurality of times to enable repetitive detection of the PDCCH message by the WD.

According to this aspect, in some embodiments, the processing circuitry is further configured to configure the PDCCH message with an identifier of other transmitted PDCCH that contain the same message. In some embodiments, the processing circuitry is further configured to cause transmission of a PDCCH candidate message with a first aggregation level in a first control resource set, CORESET, and to map the PDCCH mapped to another PDCCH candidate message transmitted with a second aggregation level in a second CORESET. In some embodiments, first and second candidate PDCCHs convey a same downlink control information. In some embodiments, different PDCCH candidates are transmitted by different network nodes.

According to yet another aspect, a method implemented in a network node includes configuring a physical downlink control channel, PDCCH, message scheduling one of a physical downlink shared channel, PDSCH, and a physical uplink shared channel, PUSCH. The method also includes transmitting the PDCCH message a plurality of times to enable repetitive detection of the PDCCH message by the WD.

According to this aspect, in some embodiments, the method includes configuring the PDCCH message with an identifier of other transmitted PDCCH that contain the same message. In some embodiments, the method further includes causing transmission of a PDCCH candidate message with a first aggregation level in a first control resource set, CORESET, and mapping the PDCCH mapped to another PDCCH candidate message transmitted with a second aggregation level in a second CORESET. In some embodiments, first and second candidate PDCCHs convey a same downlink control information, DCI. In some embodiments, different PDCCH candidates are transmitted by different network nodes.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
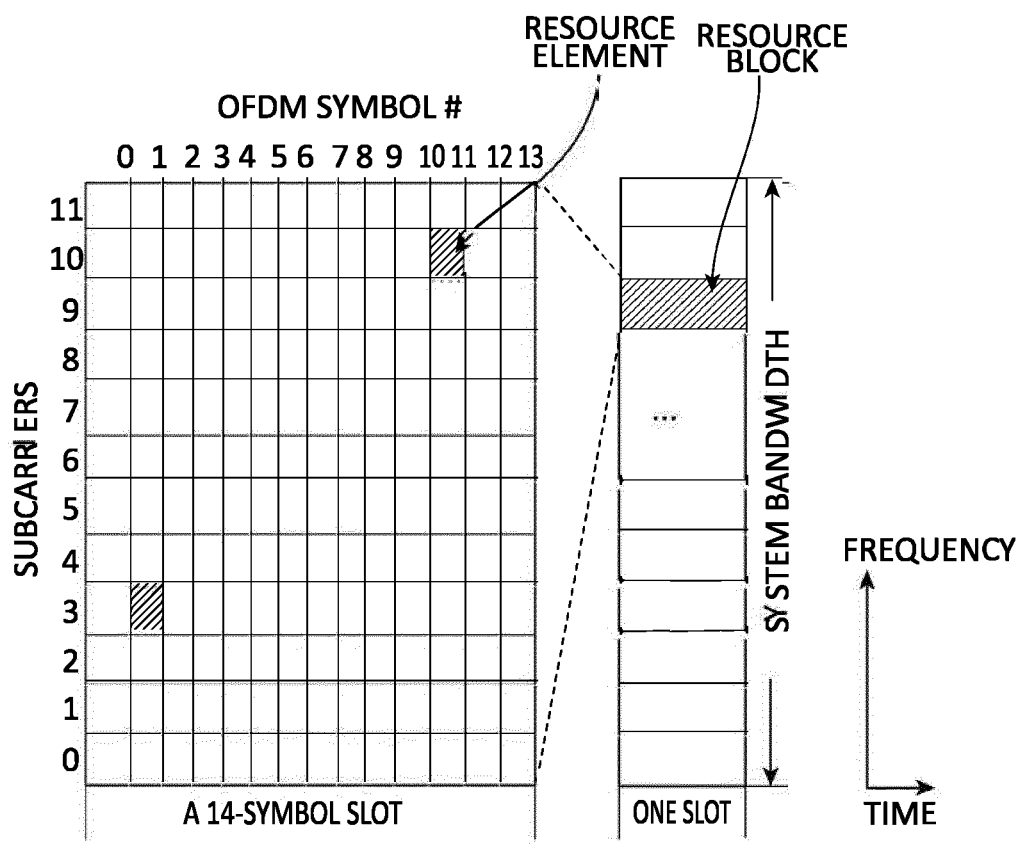
FIG. 1 is diagram of time frequency resources.

Before describing in detail exemplary embodiments, it is noted that the embodiments reside primarily in combinations of apparatus components and processing steps related to increasing robustness of a control channel. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate, and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

The disclosure provided herein allows for increased PDCCH robustness without sacrificing the data packet latency in the physical layer.

To increase robustness for the control channel (PDCCH) with short latency, the control channel transmission is repeated a plurality of times without affecting the start and stop time of the PDSCH. In addition, at least two of the PDCCH repetitions may have different source RS for QCL assumptions, allowing for spatial multiplexing diversity by the use of multiple physically separated transmission points.

Figure 2:
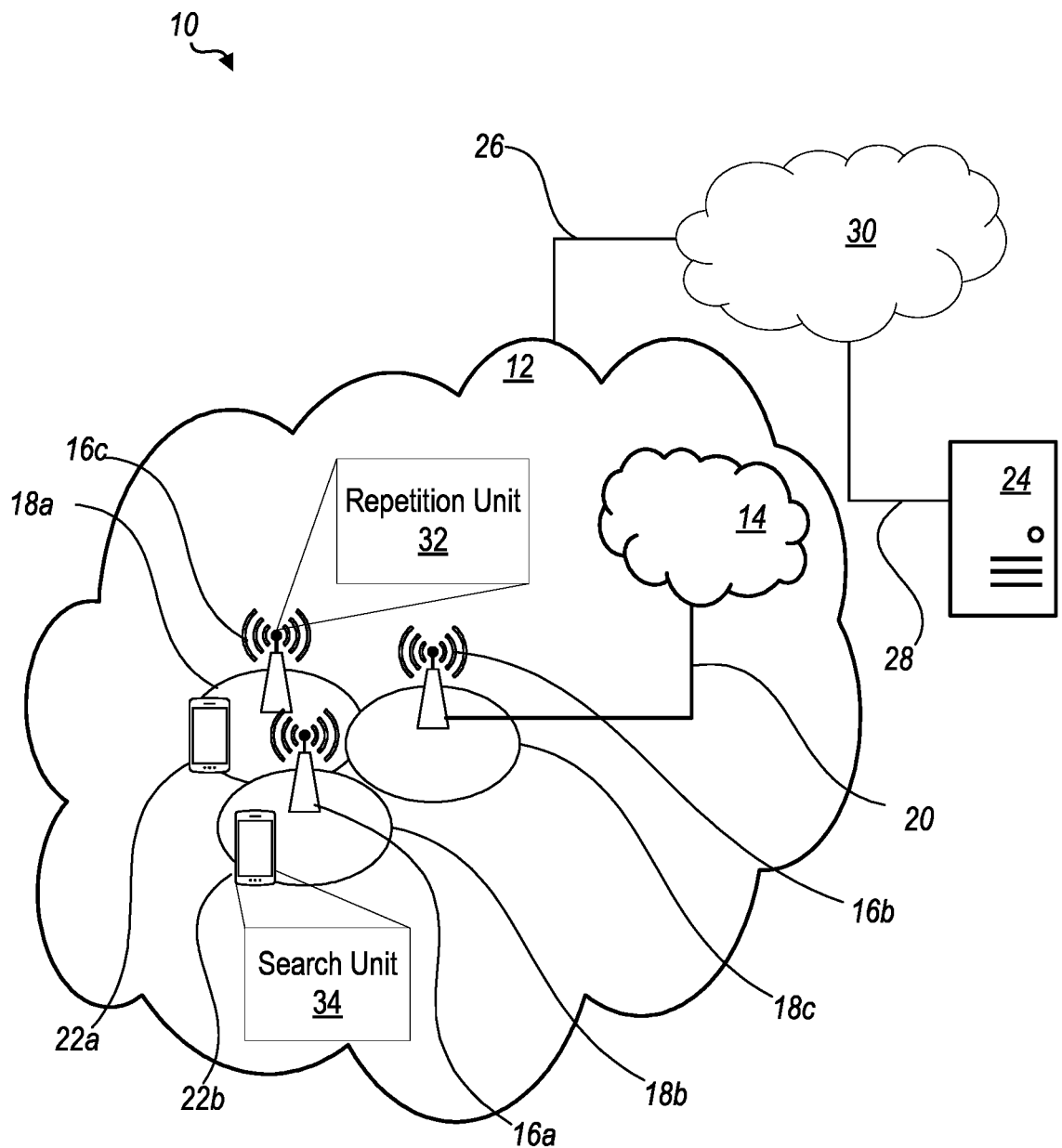
FIG. 2 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a repetition unit 32 which is configured to repeatedly transmitting the PDCCH, message to enable repetitive detection of the PDCCH message by the WD. A wireless device 22 is configured to include a search unit 34 which is configured to search the multiple received transmissions to obtain scheduling information for a physical uplink shared channel, PUSCH, transmission.

Example implementations, in accordance with an embodiment, of the WD 22, network node 16 and host computer 24 discussed in the preceding paragraphs will now be described with reference to FIG. 3. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include repetition unit to 32 configured to transmit the PDCCH message multiple times to enable repetitive detection of the PDCCH message by the WD 22.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a search unit 34 configured to search the multiple received transmissions to obtain scheduling information for a physical uplink shared channel, PUSCH, transmission.

Figure 3:
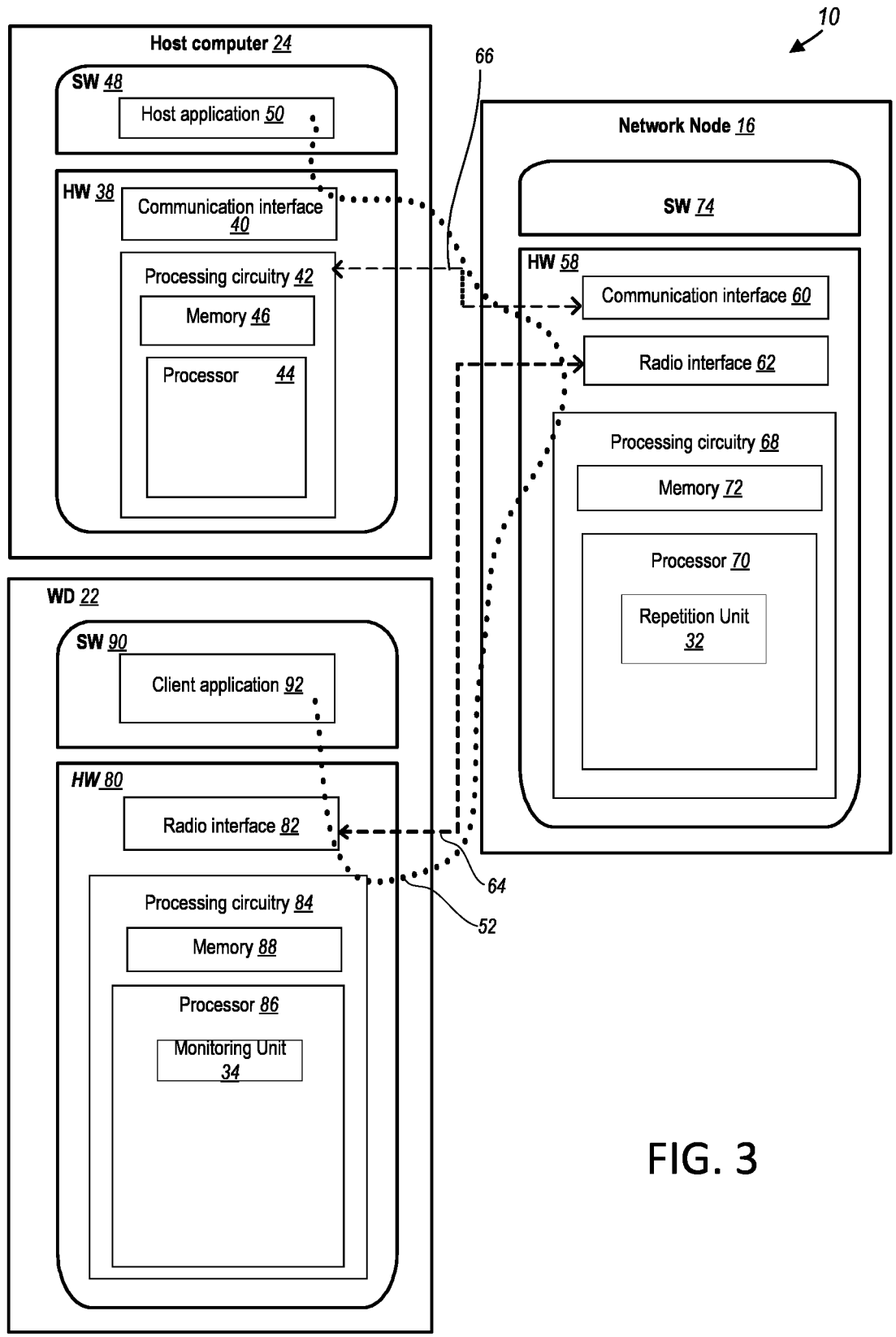
FIG. 3 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 3 and independently, the surrounding network topology may be that of FIG. 2.

In FIG. 3, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 2 and 3 show various "units" such as repetition unit 32, and search unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 4:
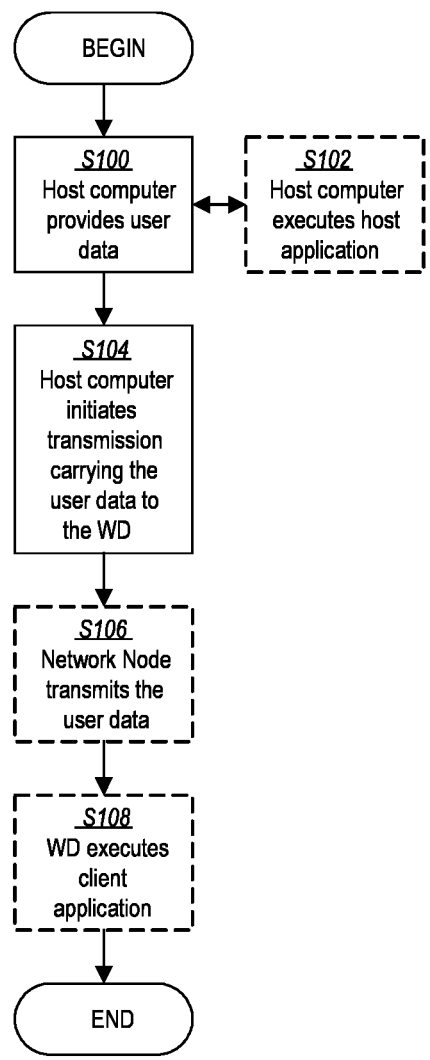
FIG. 4 is a flow chart illustrating exemplary methods implemented in a communication system including a host computer, a network node and a wireless device for executing a client application at a wireless device according to some embodiments of the present disclosure.

FIG. 4 is a flowchart illustrating an exemplary method implemented in a communication system, such as, for example, the communication system of FIGS. 2 and 3, in accordance with one embodiment. The communication system may include a host computer 24, a network node 16 and a WD 22, which may be those described with reference to FIG. 3. In a first step of the method, the host computer 24 provides user data (block S100). In an optional substep of the first step, the host computer 24 provides the user data by executing a host application, such as, for example, the host application 50 (block S102). In a second step, the host computer 24 initiates a transmission carrying the user data to the WD 22 (block S104). In an optional third step, the network node 16 transmits to the WD 22 the user data which was carried in the transmission that the host computer 24 initiated, in accordance with the teachings of the embodiments described throughout this disclosure (block S106). In an optional fourth step, the WD 22 executes a client application, such as, for example, the client application 114, associated with the host application 50 executed by the host computer 24 (block S108).

Figure 5:
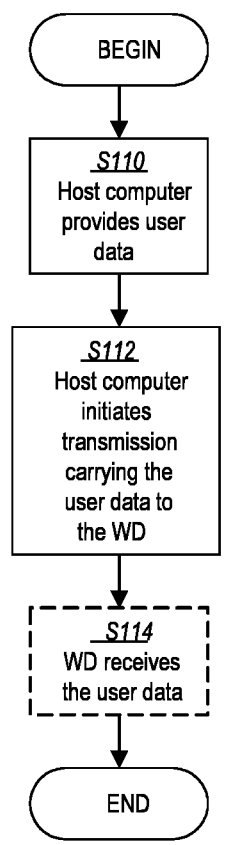
FIG. 5 is a flow chart illustrating exemplary methods implemented in a communication system including a host computer, a network node and a wireless device for receiving user data at a wireless device according to some embodiments of the present disclosure.

FIG. 5 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In a first step of the method, the host computer 24 provides user data (block S110). In an optional substep (not shown) the host computer 24 provides the user data by executing a host application, such as, for example, the host application 50. In a second step, the host computer 24 initiates a transmission carrying the user data to the WD 22 (block S112). The transmission may pass via the network node 16, in accordance with the teachings of the embodiments described throughout this disclosure. In an optional third step, the WD 22 receives the user data carried in the transmission (block S114).

Figure 6:
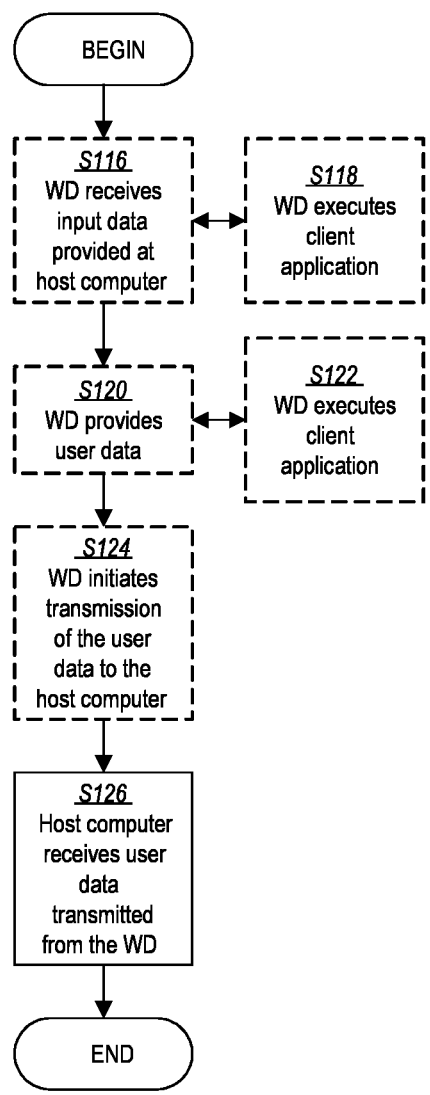
FIG. 6 is a flow chart illustrating exemplary methods implemented in a communication system including a host computer, a network node and a wireless device for receiving user data from the wireless device at a host computer according to some embodiments of the present disclosure.

FIG. 6 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, the WD 22 receives input data provided by the host computer 24 (block S116). In an optional substep of the first step, the WD 22 executes the client application 114, which provides the user data in reaction to the received input data provided by the host computer 24 (block S118). Additionally, or alternatively, in an optional second step, the WD 22 provides user data (block S120). In an optional substep of the second step, the WD provides the user data by executing a client application, such as, for example, client application 114 (block S122). In providing the user data, the executed client application 114 may further consider user input received from the user. Regardless of the specific manner in which the user data was provided, the WD 22 may initiate, in an optional third substep, transmission of the user data to the host computer 24 (block S124). In a fourth step of the method, the host computer 24 receives the user data transmitted from the WD 22, in accordance with the teachings of the embodiments described throughout this disclosure (block S126).

Figure 7:
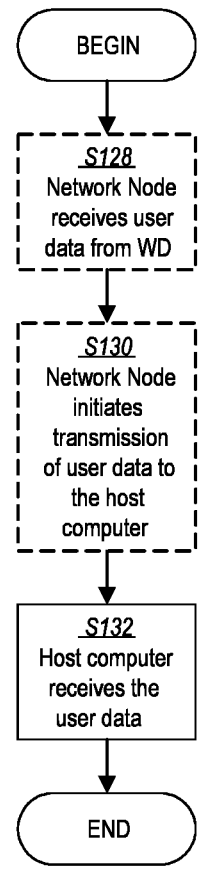
FIG. 7 is a flow chart illustrating exemplary methods implemented in a communication system including a host computer, a network node and a wireless device for receiving user data at a host computer according to some embodiments of the present disclosure.

FIG. 7 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, in accordance with the teachings of the embodiments described throughout this disclosure, the network node 16 receives user data from the WD 22 (block S128). In an optional second step, the network node 16 initiates transmission of the received user data to the host computer 24 (block S130). In a third step, the host computer 24 receives the user data carried in the transmission initiated by the network node 16 (block S132).

Figure 8:
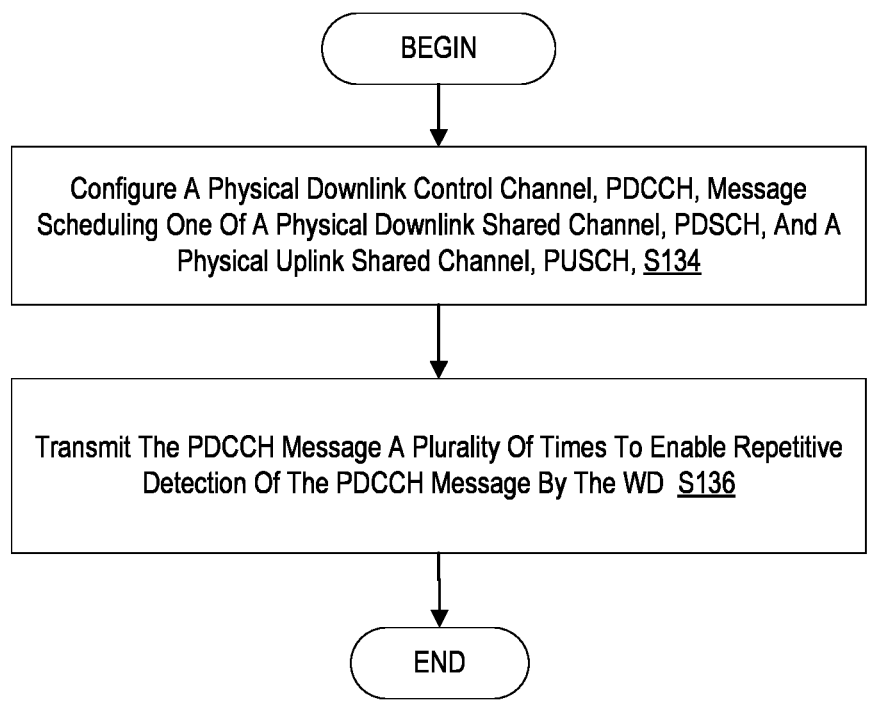
FIG. 8 is a flowchart of an exemplary process in a network node for configuring and transmitting repeated PDCCH messages.

FIG. 8 is a flowchart of an exemplary process in a network node 16 for configuring and transmitting repeated PDCCH messages. One or more blocks described herein may be performed by one or more elements of network node 16 such as by one or more of processing circuitry 68 (including the repetition unit 32), processor 70, radio interface 62 and/or communication interface 60. Network node 16 such as for example via processing circuitry 68 and/or processor 70 and/or radio interface 62 and/or communication interface 60 is configured to configure a physical downlink control channel, PDCCH, message scheduling one of a physical downlink shared channel, PDSCH, and a physical uplink shared channel, PUSCH (block S134). The process also includes transmitting, such as for example via the repetition unit 32 and/or the radio interface 62, the PDCCH message a plurality of, i.e., multiple, times to enable repetitive detection of the PDCCH message by the WD (block S136).

Figure 9:
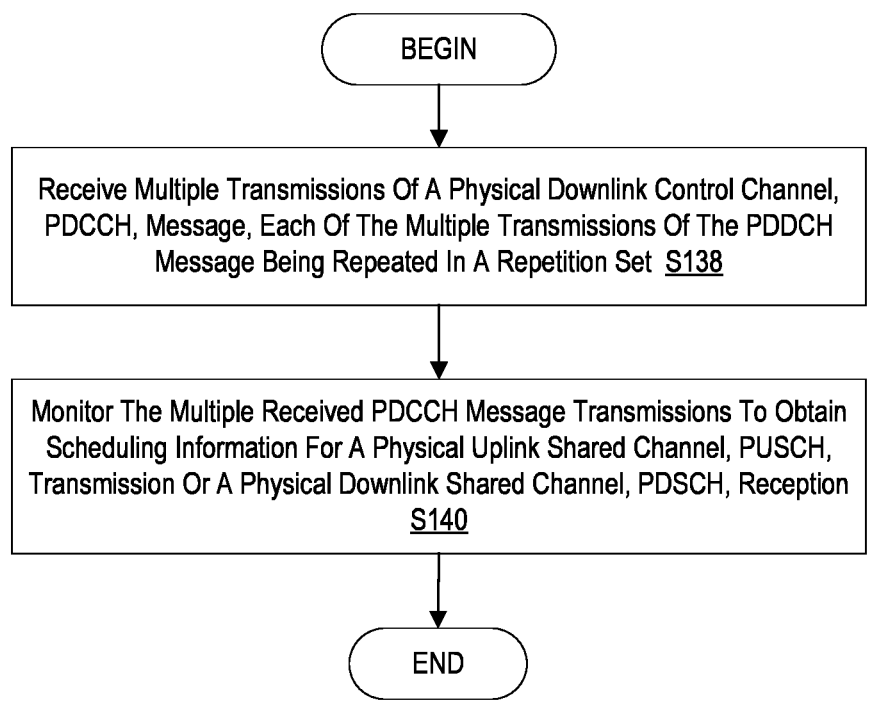
FIG. 9 is a flowchart of an exemplary process in a wireless device for obtaining scheduling information for a PUSCH transmission according to some embodiments of the present disclosure.

FIG. 9 is a flowchart of an exemplary process in a wireless device 22 according to some embodiments of the present disclosure. One or more blocks described herein may be performed by one or more elements of wireless device 22 such as by one or more of processing circuitry 84 (including the monitoring unit 34), processor 86, radio interface 82 and/or communication interface 60. Wireless device 22 such as for example via processing circuitry 84 and/or processor 86 and/or radio interface 82 is configured to receive multiple transmissions of a physical downlink control channel, PDCCH, message, each of the multiple transmissions of the PDDCH message being repeated in a repetition set (block S138). The process also includes searching, via the monitoring unit 34, the multiple received transmissions to obtain scheduling information for a physical uplink shared channel, PUSCH, transmission or a physical downlink shared channel, PDSCH, reception (block S140).

Having described the general process flow of arrangements of the disclosure and having provided examples of hardware and software arrangements for implementing the processes and functions of the disclosure, the sections below provide details and examples of arrangements for increasing robustness of a control channel.

The WD 22 is configured by higher layer signaling such as radio resource control (RRC) signaling, to monitor at least one "repetition set of a PDCCH candidate" where the PDCCH candidates are located in the search spaces of one or multiple control resource sets (CORESETs). Higher layer signaling indicates from the network to the WD 22 that the WD 22 may combine the multiple PDCCHs in a repetition set in order to improve the reception of that PDCCH candidate.

Hence, a PDCCH candidate defined with a repetition set may comprise multiple PDCCHs where each PDCCH contain same information and may in some embodiments indeed contain the same exact downlink control information (DCI) payload. The information, if containing scheduling information, schedules one and the same data transmission in downlink (PDSCH) or uplink (PUSCH). Each PDCCH candidate in the set is self-decodable. Hence if the WD 22 detects, via processing circuitry 84, only one PDCCH in the set successfully, it can receive the scheduling grant or assignment.

In order to improve the detection robustness of PDCCH, the WD 22 may in its implementation choose to monitor all search spaces in the repetition set of the PDCCH candidate and try to independently decode, via processing circuitry 84, each PDCCH without performing soft combining across PDCCHs. This would of itself provide robustness since the WD 22 has more than one chance to decode the PDCCH candidate, without adding complexity to the WD 22 incurred by having to buffer soft values of DCI bits. In other implementations, the WD 22 may combine, via the radio interface 82 and/or processing circuitry 84, the soft estimates of DCI bits for each repetition of a PDCCH candidate in the repetition set in order to further improve the successful decoding probability. However, this may require that the multiple repetitions of the PDCCH candidate occur in search spaces/CORESETs of equal size and that the same DCI content is transmitted in the different sets of control channel elements (CCEs) so that soft vales of PDDCH candidates in different repetitions sets can be combined. That is, there is a one-to-one mapping between each PDCCH candidate in the repetition set. In alternative embodiments, one PDCCH candidate in a first repetition (i.e., a certain set of CCEs for a certain aggregation level) is mirrored using another aggregation level and another PDCCH candidate (i.e., another set of CCEs) in the second repetition.

The WD 22 may be configured with multiple such repetition sets simultaneously, for example, one set of PDCCH candidates that all contain the same information for PDSCH scheduling and another set of PDCCH candidates that contain the same information for PUSCH scheduling.

Among all the PDCCH the WD 22 monitors, via the monitoring unit 34, and attempts to decode, via the processing circuitry 84, simultaneously (i.e., in two or more contiguous downlink slots, in two or more CORESETs located in the same slot), there may be one or more repetition sets and there may also be PDCCH candidates monitored that do not belong to the repetition set, for example, allowing for less robustness but lower PDCCH overhead. Hence, the WD 22 can be served by multiple levels of services simultaneously, targeting simultaneous mobile data transmission (less robustness) and ultra-reliable and low latency communication (URLLC) services.

Each repetition set may be configured, via the processing circuitry 68 of a network node 16, with a different level of repetition and/or aggregation level (independent configuration of the number of PDCCH candidates in the repetition set), to allow for different reliability for, e.g., scheduling on the uplink or the downlink.

The PDCCH candidates within each repetition set may be configured, via the processing circuitry 68, with different QCL assumptions. Hence, different candidates can be transmitted, via radio interface 62, from different network transmission points (TRPs) such as different network nodes 16, e.g., gNBs. One way to accomplish this is to provide candidates associated with different transmission configuration indication (TCI) states. Another way is to configure at least two candidates in the repetition set to different CORESETs. Since each CORESET is in turn associated with an independently configured TCI state, the network can use different TCI states (with a different source QCL reference signal) if CORESETs are transmitted from different transmission points or from different antenna panels within the same transmission point.

In some embodiments, multiple CORESETs are configured and a repetition set is configured across the CORESETs. Hence, a given PDCCH candidate is repeated, or mirrored, in another CORESET. The relation may be one to one, meaning that for a given PDCCH candidate, with a given DCI size in the first set, there is a corresponding candidate in the other set with the same DCI size. The WD 22, via the processing circuitry 84, can therefore, for each DCI size, combine candidates from multiple CORESETs and obtain increased PDCCH detection robustness. Note that for a given PDCCH, the WD 22 may try to decode with different DCI payloads and/or different radio network temporary identifiers RNTIs. To accomplish this configuration, one possibility is that when configuring a CORESET, the configuration contains not only the ID of the CORESET (controlResourceSetID), but also another ID or a list of other IDs referring to additional CORESETs that contain repeated information.

This assumes an implicit one-to-one mapping between each PDCCH candidate in each aggregation level between the CORESETs. In other embodiments, there is an explicit signaling of the mapping between the PDCCH candidates of the different CORESETS. For instance, a PDCCH candidate number x transmitted via the radio interface 62 with a certain aggregation level (AL) in a first CORESET is mapped to another PDCCH candidate y transmitted via the radio interface 62 with another aggregation level in another CORESET (but the two PDCCH candidates convey the same DCI). This may be beneficial for instance if different aggregation levels are needed when the PDCCHs are transmitted from different TRPs due to, for instance, a difference in path loss. Hence, the signaling that defines the repetition may be realized as a mapping of PDCCH candidate index, or aggregation level, pairs between two or more CORESETs.

In an alternative embodiment, the WD 22 may be configured with multiple search spaces where there is a repetition association between different search spaces. Hence, a given PDCCH candidate in a search may be repeated, or mirrored, in another search space, achieving a repetition set. The relation may be one to one, meaning that for a given PDCCH candidate with a given DCI size in the first search space there is a corresponding candidate in the other search space with the same DCI size and using the same aggregation level. The WD 22 can therefore, for each DCI size, combine, via the processing circuitry 84, candidates from multiple search spaces and obtain increased PDCCH detection robustness. Note that for a given PDCCH, the WD 22 may try to decode with different DCI payloads and/or different RNTIs.

To accomplish this configuration, one possibility is that when configuring a search space, the configuration contains not only the ID of the search space but also an ID or a list of IDs referring to additional search spaces that contain repeated information (i.e., a repetition set). It is then possible, since search space configuration includes an ID to a CORESET, to map these different search spaces that are related by repetition to different CORESETs and thereby allow for configuration of different TCI states per search space and hence, achieve spatial diversity across panels or transmission points. There can be a one to one mapping between the search spaces so for each of the PDCCH candidates per CCE aggregation level in one search space, there is an identified identical candidate for the same aggregation level in the other search space.

In an alternative embodiment, the search space configuration contains multiple CORESET IDs, hence the search space is present/repeated/mirrored in more than one CORESET simultaneously, in order to accomplish the repetition as mentioned above. This then accomplishes the presence of a repetition set. The WD 22, via processing circuitry 84 and/or radio interface 82, may in this case combine a given PDCCH candidate for a search space that is present in different CORESETs. Each search space configuration may have a different number in the list of associated CORESET IDs allowing for different levels of robustness for different search spaces.

In a further embodiment, when counting the number of blind decodes, a given PDCCH candidate that is repeated more than once (e.g., across CORESETs) should only be counted as a single monitored PDCCH candidate. Hence, it is possible to configure multiple repetitions and an increased number of search spaces without increasing the WD 22 burden on performing blind decoding.

Figure 10:
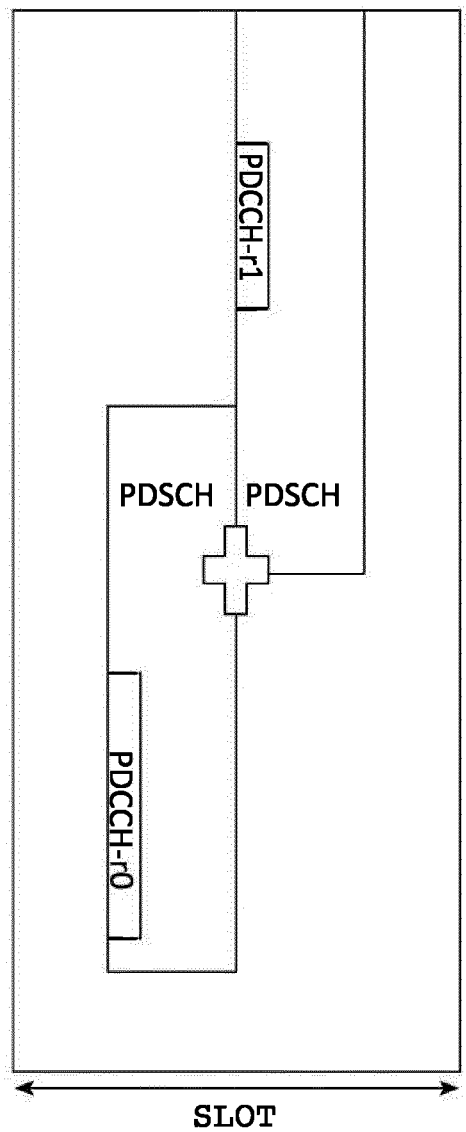
FIG. 10 is a diagram of PDSCH and PDCCH with offsets.
Figure 11:
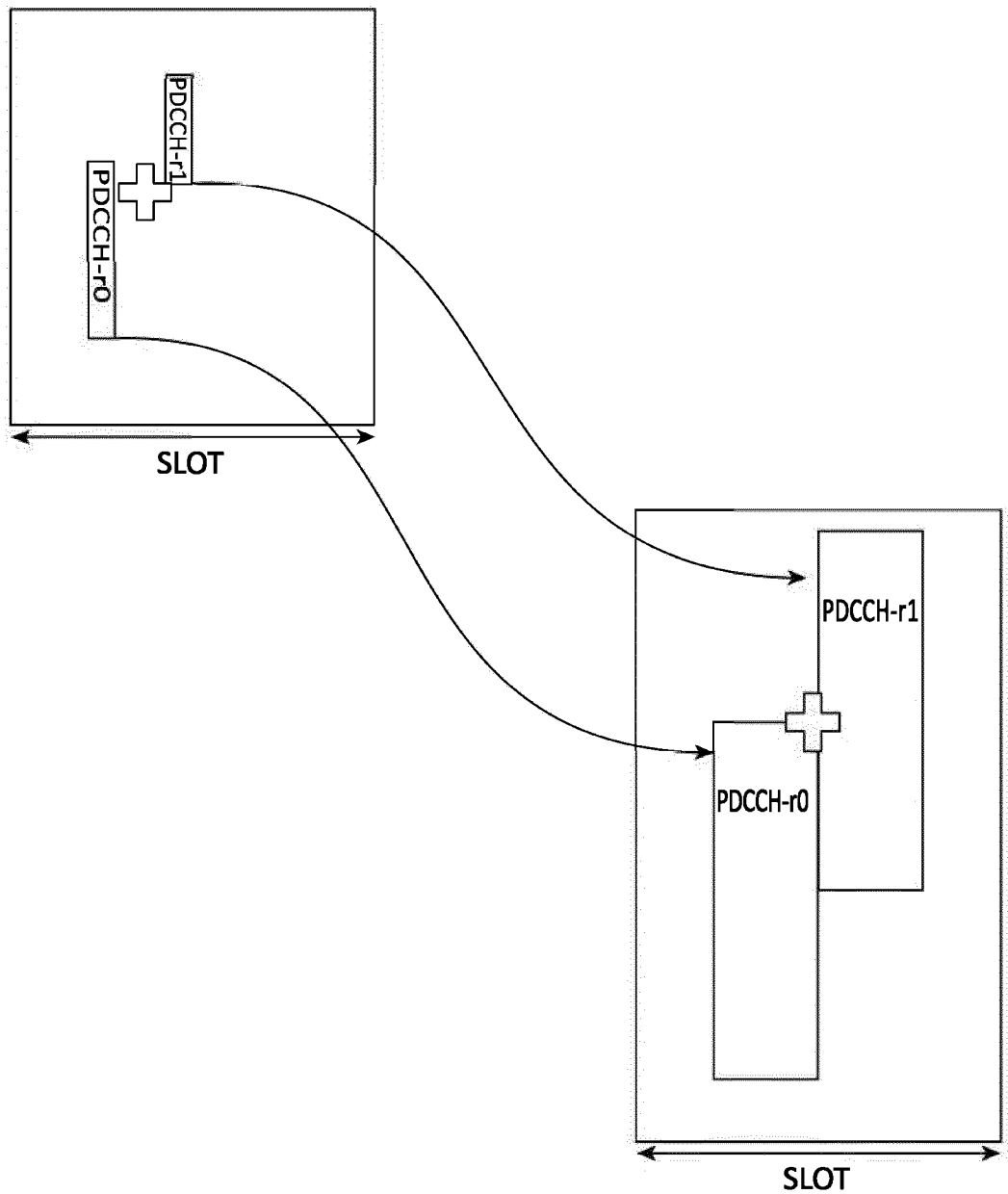
FIG. 11 is a diagram of offset PDCCH and offset PUSCH.

In some embodiments, each PDCCH in the repetition set schedules a separate PDSCH or PUSCH. That is, each PDCCH has a self-contained message scheduling a separate PDSCH or PUSCH in such embodiments. Thus, not only is the control information repeated for diversity purposes, but so is the data transmission. Examples of these embodiments are illustrated in FIG. 10 and FIG. 11. Such embodiments may be beneficial when latency requirements and reliability requirements are to be met, so that a PDSCH or PUSCH can be transmitted immediately after the first PDCCH is transmitted.

In other embodiments, the multiple PDCCHs in the repetition set schedules only a single PDSCH or PUSCH. That is, there is a multiple-to-one mapping between the PDCCHs and the PUSCH/PDSCH. For instance, a number of PDCCHs scheduling the same PDSCH may be transmitted in subsequent slots, where a first PDCCH schedules a PDSCH in slot n+2 relative to itself, while a second PDCCH schedules the same PDSCH in slot n+1 relative to itself.

One issue to be addressed for these embodiments is that the relative PDSCH/PUSCH scheduling offset is given with respect to the scheduling DCI, so that if two DCIs schedule the same PDSCH, but where their respective PDCCHs are transmitted in different slots, the time-domain resource allocation field of the respective DCIs might need to be different to indicate a different relative scheduling offset. This might then prohibit the WD 22 from soft combining the respective PDCCHs since the DCI content would be different. To resolve this issue, in some embodiments, a rule is introduced where the PDSCH/PUSCH scheduling offset is determined from the earliest time at which a PDCCH in the PDCCH candidate repetition set may be received. In this configuration, even if the WD 22 detects, via the processing circuitry 84, the PDCCH only after the second repetition of the PDCCH in a later repetition occasion than the earliest one, the WD 22 determines, via the processing circuitry 84, the PDSCH/PUSCH scheduling offset (i.e., it interprets the time-domain resource allocation (TDRA) field of the DCI) to be relative to the first PDCCH reception occasion in the PDCCH repetition set. By this, the TDRA field is the same for all repetitions and thus the DCI bits may be the same, regardless of which PDCCH in which repetition of the repetition set carries it, which enables the WD 22 to soft combine the received PDCCHs from multiple repetitions.

The following pseudo codes illustrates as example of how the RRC signaling for the search space IE can be constructed, and which can be read and interpreted by a WD 22 of Release later than the first NR release (3GPP Rel.15). Here 3GPP Rel.16 is assumed ("r16" is added to the name of the IE). A RepetitionSetList is introduced (compared to the legacy SearchSPace IE), used to create an association between candidates in the different search spaces according to some embodiments.

```
SearchSpace-r16 ::=            SEQUENCE {
    searchSpaceId              SearchSpaceId,
    RepetitionSetList          SEQUENCE (SIZE
(1..maxNrofRep)) OF RepetitionSet
        monitoringSlotPeriodicityAndOffset    CHOICE {
            sl1
                NULL,
            sl2
                INTEGER (0..1),
            sl4
                INTEGER (0..3),
            sl5                INTEGER
(0..4),
            sl8
                INTEGER (0..7),
            sl10               INTEGER
(0..9),
            sl16               INTEGER
(0..15),
            sl20               INTEGER
(0..19),
            sl40               INTEGER
(0..39),
            sl80               INTEGER
(0..79),
            sl160              INTEGER
(0..159),
            sl320              INTEGER
(0..319),
            sl640              INTEGER
(0..639),
            sl1280             INTEGER
(0..1279),
            sl2560             INTEGER
(0..2559)
        }
            OPTIONAL,  -- Cond Setup
        duration               INTEGER
(2..2559)
                               OPTIONAL, -- Need R
        nrofCandidates         SEQUENCE {
            aggregationLevel1  ENUMERATED
{n0, n1, n2, n3, n4, n5, n6, n8},
            aggregationLevel2  ENUMERATED
{n0, n1, n2, n3, n4, n5, n6, n8},
            aggregationLevel4  ENUMERATED
{n0, n1, n2, n3, n4, n5, n6, n8},
            aggregationLevel8  ENUMERATED
{n0, n1, n2, n3, n4, n5, n6, n8},
            aggregationLevel16 ENUMERATED
{n0, n1, n2, n3, n4, n5, n6, n8}
        }
                               OPTIONAL, -- Cond Setup
        searchSpaceType        CHOICE {
            common
                SEQUENCE {
                    dci-Format0-0-AndFormat1-0
                        SEQUENCE {
                            ...
                        }
                                           OPTIONAL,  -- Need R
                    dci-Format2-0
```

```
                        SEQUENCE {
                            nrofCandidates-SFI
                                SEQUENCE {
                                    aggregationLevel1
                                        ENUMERATED {n1, n2}
                                            OPTIONAL,  -- Need R
                                    aggregationLevel2
                                        ENUMERATED {n1, n2}
                                            OPTIONAL,  -- Need R
                                    aggregationLevel4
                                        ENUMERATED {n1, n2}
                                            OPTIONAL,  -- Need R
                                    aggregationLevel8
                                        ENUMERATED {n1, n2}
                                            OPTIONAL,  -- Need R
                                    aggregationLevel16
                                        ENUMERATED {n1, n2}
                                            OPTIONAL   -- Need R
                                },
                                ...
                        }
                                           OPTIONAL,  -- Need R
                    dci-Format2-1
                        SEQUENCE {
                            ...
                        }
                                           OPTIONAL,  -- Need R
                    dci-Format2-2
                        SEQUENCE {
                            ...
                        }
                                           OPTIONAL,  -- Need R
                    dci-Format2-3
                        SEQUENCE {
                            monitoringPeriodicity
                                ENUMERATED {n1, n2, n4, n5, n8, n10, n16, n20 }
                                    OPTIONAL,  -- Cond Setup
                            nrofPDCCH-Candidates
                                ENUMERATED {n1, n2},
                                ...
                        }
                                           OPTIONAL   -- Need R
                },
            ue-Specific
                SEQUENCE {
                    dci-Formats
                        ENUMERATED {formats0-0-And-1-0, formats0-1-And-1-1},
                        ...
                }
                                           OPTIONAL   -- Cond Setup
        }
}
RepetitionSet ::=      SEQUENCE {
    controlResourceSetId               ControlResourceSetId
        OPTIONAL,  -- Cond SetupOnly
    monitoringSymbolsWithinSlot        BIT STRING (SIZE (14))
        OPTIONAL,  -- Cond Setup
```

The maximum number of repetitions of a PDCCH candidate in a search space can be defined as follows, e.g., 4 repetitions:

maxNrofRep INTEGER::=4—Maximum number of repetitions of PDCCH candidates in a search space It is worth noting that PDCCH repetition is possible also in LTE machine type communication (MTC) and for LTE URLLC. However, some embodiments provide several differences compared to these techniques as described below:

Some differences between the embodiments disclosed herein and repetition of LTE MTC (MPDCCH) may include:

In MTC, the scheduled PDSCH cannot start before the end of R repetitions of machine PDCCH (MPDCCH). The starting point of PDSCH is measured from the end of R repetitions. The info of R is carried as part of DCI, so that WD 22 knows when the PDSCH starts. For example, if R=4 repetitions of MPDCCH are being transmitted, then even if the WD 22 manages to successfully decode DCI using 1 or 2 repetitions, the WD 22 must wait till the end of 4 MPDDCH repetition to receive PDSCH.

In some embodiments, latency is improved compared to LTE MPDCCH repetition. PDSCH transmission can begin immediately, even in the same orthogonal frequency division multiplexed (OFDM) symbol as the PDCCH. There is no need to wait until the end of R repetitions of PDCCH (if PDCCH is repeated R times). Hence, ideally from a latency perspective, PDSCH may start at the same time as a first repetition of PDCCH. In some embodiments, the WD 22 buffers the PDSCH symbols, decodes the multiple repeated PDCCH candidates, combine them and then decodes PDSCH accordingly.

In MTC, a repetition of the PDCCH may be used. There is no possibility to achieve spatial diversity by utilizing multi-TRP, multi-panel or antenna techniques where different QCL assumptions are involved.

a) In some embodiments, a transmit format can be different between the repetitions, including: TCI, frequency location, aggregation level.

In MTC, due to limited WD reception capability, MPDCCH (evolved from EPDCCH) is limited to a narrowband of 6 physical resource blocks (PRB).

a) In some embodiments, in contrast: the WD 22 is highly capable. Frequency diversity can be leveraged by repeating the PDCCH at two widely separated frequency locations by the methods described herein.

Some differences of the embodiments described herein compared to repetition of PDCCH for LTE URLLC may include as follows:

In LTE URLLC, there is no explicit leverage of TCI or other multi-TRP techniques. In LTE URLLC, each PDCCH is independent and repetition of the PDCCH is transparent to specification in terms of transmit format such as search space. Additionally, the DCI content of each repetition can be different. For example, the field indicating how many PDSCH repetitions are remaining would decrement. Thus, the multiple PDCCH repetitions may not be coherently combined in LTE URLLC.

Thus, in some embodiments, the network node 16 is configured such that the PDCCH message has an identifier of other transmitted PDCCHs that contain the same message. In some embodiments, the network node 16 is configured such that a PDCCH candidate message is transmitted with a first aggregation level in a first control resource set, CORESET and is mapped to another PDCCH candidate message transmitted with a second aggregation level in a second CORESET. In some embodiments, the first and second candidate PDCCH convey a same downlink control information, DCI, message. In some embodiments, the different PDCCH candidate are transmitted by different network nodes.

Further, in some embodiments, the WD is configured with multiple search spaces where there is a repetition association between different search spaces, and wherein a PDCCH candidate in a search space is repeated in another search space to achieve a repetition set. In some embodiments, the WD is configured such that for a first PDCCH candidate in a first search space, the first PDCCH candidate has a first downlink control information, DCI, and there is a corresponding PDCCH candidate in another search space having a same sized DCI as the first PDCCH candidate. In some embodiments, the WD can, for each of a plurality of DCI sizes, combine PDCCH candidates from multiple search spaces to obtain PDCCH detection robustness. In some embodiments, a search space configuration contains multiple identifiers indicating multiple PDCCH candidates, to enable a search of the PDCCH candidate based on the identifiers.

Thus, according to one aspect, a wireless device (WD 22) configured to communicate with a network node 16, the WD 22 comprising processing circuitry 84 configured to: receive multiple transmissions of a physical downlink control channel, PDCCH, message, each of the multiple transmissions of the PDDCH message being repeated in a repetition set; and monitor the multiple received PDCCH message transmissions to obtain scheduling information for a physical uplink shared channel, PUSCH, transmission or a physical downlink shared channel, PDSCH, reception.

According to this aspect, in some embodiments, the processing circuitry 84 is further configured to combine the multiple received PDCCH message transmissions in the repetition set to determine a PDCCH candidate. In some embodiments, each PDCCH message transmission is separately decodable to produce a PDCCH candidate. In some embodiments, the WD 22 is configured with multiple search spaces where there is a repetition association between different search spaces, and wherein a PDCCH candidate in a search space is repeated in another search space to achieve a repetition set. In some embodiments, for a first PDCCH candidate in a first search space, the first PDCCH candidate having a first downlink control information, DCI, there is a corresponding PDCCH candidate in another search space having a same sized DCI as the first PDCCH candidate. In some embodiments, the WD 22 can, for each of a plurality of DCI sizes, combine PDCCH candidates from multiple search spaces to obtain PDCCH detection robustness. In some embodiments, a search space configuration contains multiple identifiers indicating multiple PDCCH candidates, to enable a search of a PDCCH candidate based on the identifiers. In some embodiments, the processing circuitry 84 is further configured to count blind decodes such that a given PDCCH candidate that is repeated is counted as a single monitored PDCCH candidate. In some embodiments, each PDCCH in the repetition set schedules a separate PDSCH or PUSCH. In some embodiments, multiple PDCCHs schedule a same PDSCH or PUSCH to achieve a many-to-one mapping of the PDCCH to the PDSCH or PUSCH. In some embodiments, the processing circuitry 84 is further configured to determine a scheduling offset between a PDSCH and a PUSCH based on an earliest time location at which a PDCCH candidate of the repetition set can be received.

According to another aspect, a method implemented in a wireless device (WD 22) includes receiving multiple transmissions of a physical downlink control channel, PDCCH, message, each of the multiple transmissions of the PDDCH message being repeated in a repetition set. The method also includes monitoring the multiple received PDCCH message transmissions to obtain scheduling information for a physical uplink shared channel, PUSCH, transmission or a physical downlink shared channel, PDSCH, reception.

According to this aspect, in some embodiments, the method further includes combining the multiple received PDCCH message transmissions in the repetition set to determine a PDCCH candidate. In some embodiments, each PDCCH message transmission is separately decodable to produce a PDCCH candidate. In some embodiments, the method also includes searching multiple search spaces where there is a repetition association between different search spaces, and wherein a PDCCH candidate in a search space is repeated in another search space to achieve a repetition set. In some embodiments, the method further includes searching for a first PDCCH candidate in a first search space, the first PDCCH candidate having a first downlink control information, DCI, there being a corresponding PDCCH candidate in another search space having a same sized DCI as the first PDCCH candidate. In some embodiments, the method further includes combining PDCCH candidates from multiple search spaces to obtain PDCCH detection robustness. In some embodiments, the method further includes searching for a PDCCH candidate based on multiple identifiers in a search space configuration, the multiple identifiers indicating multiple PDCCH candidates. In some embodiments, the method further includes counting blind decodes such that a given PDCCH candidate that is repeated is counted as a single monitored PDCCH candidate. In some embodiments, each PDCCH in the repetition set schedules a separate PDSCH or PUSCH. In some embodiments, multiple PDCCHs schedule a same PDSCH or PUSCH to achieve a many-to-one mapping of the PDCCH to the PDSCH or PUSCH. In some embodiments, the method further includes determining a scheduling offset between a PDSCH and a PUSCH based on an earliest time location at which a PDCCH candidate of the repetition set can be received.

According to another aspect, a network node 16 is configured to communicate with a wireless device (WD 22). The network node 16 includes processing circuitry 68 configured to configure a physical downlink control channel, PDCCH, message scheduling one of a physical downlink shared channel, PDSCH, and a physical uplink shared channel, PUSCH. The processing circuitry is further configured to transmit the PDCCH message a plurality of times to enable repetitive detection of the PDCCH message by the WD 22.

According to this aspect, in some embodiments, the processing circuitry 68 is further configured to configure the PDCCH message with an identifier of other transmitted PDCCH that contain the same message. In some embodiments, the processing circuitry 68 is further configured to cause transmission of a PDCCH candidate message with a first aggregation level in a first control resource set, CORESET, and to map the PDCCH mapped to another PDCCH candidate message transmitted with a second aggregation level in a second CORESET. In some embodiments, first and second candidate PDCCHs convey a same downlink control information. In some embodiments, different PDCCH candidates are transmitted by different network nodes.

According to yet another aspect, a method implemented in a network node 16 includes configuring a physical downlink control channel, PDCCH, message scheduling one of a physical downlink shared channel, PDSCH, and a physical uplink shared channel, PUSCH. The method also includes transmitting the PDCCH message a plurality of times to enable repetitive detection of the PDCCH message by the WD 22.

According to this aspect, in some embodiments, the method includes configuring the PDCCH message with an identifier of other transmitted PDCCH that contain the same message. In some embodiments, the method further includes causing transmission of a PDCCH candidate message with a first aggregation level in a first control resource set, CORESET, and mapping the PDCCH mapped to another PDCCH candidate message transmitted with a second aggregation level in a second CORESET. In some embodiments, first and second candidate PDCCHs convey a same downlink control information, DCI. In some embodiments, different PDCCH candidates are transmitted by different network nodes.

Some embodiments include the following:

Embodiment A1. A network node configured to communicate with a wireless device (WD), the network node configured to, and/or comprising a radio interface and/or comprising processing circuitry configured to:
configure a physical downlink control channel, PDCCH, message scheduling one of a physical downlink shared channel, PDSCH, and a physical uplink shared channel, PUSCH;
and transmit the PDCCH message a plurality of times to enable repetitive detection of the PDCCH message by the WD.

Embodiment A2. The network node of Embodiment A1, wherein the PDCCH message has an identifier of other transmitted PDCCH that contain the same message.

Embodiment A3. The network node of Embodiment A1, wherein a PDCCH candidate message is transmitted with a first aggregation level in a first control resource set, CORESET and is mapped to another PDCCH candidate message transmitted with a second aggregation level in a second CORESET.

Embodiment A4. The network node of Embodiment A3, wherein the first and second candidate PDCCH convey a same downlink control information, DCI.

Embodiment A5. The network node of Embodiment A3, wherein the different PDCCH candidate are transmitted by different network nodes.

Embodiment B1. A method implemented in a network node, the method comprising
configuring a physical downlink control channel, PDCCH, message scheduling one of a physical downlink shared channel, PDSCH, and a physical uplink shared channel, PUSCH;
and transmitting the PDCCH message a plurality of times to enable repetitive detection of the PDCCH message by the WD.

Embodiment B2. The method of Embodiment B1, wherein the PDCCH message has an identifier of other transmitted PDCCH that contain the same message.

Embodiment B3. The method of Embodiment B1, wherein a PDCCH candidate message is transmitted with a first aggregation level in a first control resource set, CORESET and is mapped to another PDCCH candidate message transmitted with a second aggregation level in a second CORESET.

Embodiment B4. The method of Embodiment B3, wherein the first and second candidate PDCCH convey a same downlink control information, DCI.

Embodiment B5. The method of Embodiment B3, wherein the different PDCCH candidate are transmitted by different network nodes.

Embodiment C1. A wireless device (WD) configured to communicate with a network node, the WD configured to, and/or comprising a radio interface and/or processing circuitry configured to:
receive multiple transmissions of a physical downlink control channel, PDCCH, message; and
search the multiple received transmissions to obtain scheduling information for a physical uplink shared channel, PUSCH, transmission.

Embodiment C2. The WD of Embodiment C1, wherein the WD is configured with multiple search spaces where there is a repetition association between different search spaces, and wherein a PDCCH candidate in a search space is repeated in another search space to achieve a repetition set.

Embodiment C3. The WD of Embodiment C1, wherein for a first PDCCH candidate in a first search space, the first PDCCH candidate having a first downlink control information, DCI, there is a corresponding PDCCH candidate in another search space having a same sized DCI as the first PDCCH candidate.

Embodiment C4. The WD of Embodiment C3, wherein the WD can, for each of a plurality of DCI sizes, combine PDCCH candidates from multiple search spaces to obtain PDCCH detection robustness.

Embodiment C5. The WD of Embodiment C1, wherein a search space configuration contains multiple identifiers indicating multiple PDCCH candidates, to enable a search of the PDCCH candidate based on the identifiers.

Embodiment D1. A method implemented in a wireless device (WD), the method comprising:
receiving multiple transmissions of a physical downlink control channel, PDCCH, message; and
searching the multiple received transmissions to obtain scheduling information for a physical uplink shared channel, PUSCH, transmission.

Embodiment D2. The method of Embodiment D1, wherein the WD is configured with multiple search spaces where there is a repetition association between different search spaces, and wherein a PDCCH candidate in a search space is repeated in another search space to achieve a repetition set.

Embodiment D3. The method of Embodiment D1, wherein for a first PDCCH candidate in a first search space, the first PDCCH candidate having a first downlink control information, DCI, there is a corresponding PDCCH candidate in another search space having a same sized DCI as the first PDCCH candidate.

Embodiment D4. The method of Embodiment D3, wherein the WD can, for each of a plurality of DCI sizes, combine PDCCH candidates from multiple search spaces to obtain PDCCH detection robustness.

Embodiment D5. The method of Embodiment D1, wherein a search space configuration contains multiple identifiers indicating multiple PDCCH candidates, to enable a search of the PDCCH candidate based on the identifiers.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A wireless device, WD, configured to communicate with a network node, the WD comprising processing circuitry configured to:
   receive multiple transmissions of a physical downlink control channel, PDCCH, message, each of the multiple transmissions of the PDCCH message being repeated in a repetition set;
   monitor the multiple received PDCCH message transmissions to obtain scheduling information for one of a physical uplink shared channel, PUSCH, transmission and a physical downlink shared channel, PDSCH, reception; and
   determine a scheduling offset for a PDSCH or a PUSCH based on a time location of a PDCCH candidate of the repetition set.

2. The WD of claim 1, wherein the processing circuitry is further configured to combine the multiple received PDCCH message transmissions in the repetition set to determine the PDCCH candidate.

3. The WD of claim 1, wherein each PDCCH message transmission is separately decodable to produce the PDCCH candidate.

4. The WD of claim 2, wherein the WD is configured with multiple search spaces where there is a repetition association between different search spaces, and wherein the PDCCH candidate in a search space is repeated in another search space to achieve the repetition set.

5. The WD of claim 1, wherein for a first PDCCH candidate in a first search space, the first PDCCH candidate having a first downlink control information, DCI, there is a corresponding PDCCH candidate in another search space having a same sized DCI as the first PDCCH candidate.

6. The WD of claim 5, wherein the WD can, for each of a plurality of DCI sizes, combine PDCCH candidates from multiple search spaces to obtain PDCCH detection robustness.

7. The WD of claim 1, wherein a search space configuration includes multiple identifiers indicating multiple PDCCH candidates, to enable a search of the PDCCH candidate based on the identifiers.

8. The WD of claim 7, wherein the processing circuitry is further configured to count blind decodes such that a given PDCCH candidate that is repeated is counted as a single monitored PDCCH candidate.

9. The WD of claim 1, wherein each PDCCH in the repetition set schedules a separate one of the PDSCH and the PUSCH.

10. The WD of claim 1, wherein multiple PDCCHs schedule a same PDSCH or PUSCH to achieve a many-to-one mapping of the PDCCH to the one of the PDSCH and the PUSCH.

11. The WD of claim 1, wherein the time location is an earliest time location at which the PDCCH candidate of the repetition set can be received.

12. A method implemented in a wireless device (WD), WD, the method comprising:
   receiving multiple transmissions of a physical downlink control channel, PDCCH, message, each of the multiple transmissions of the PDCCH message being repeated in a repetition set;
   monitoring the multiple received PDCCH message transmissions to obtain scheduling information for one of a physical uplink shared channel, PUSCH, transmission and a physical downlink shared channel, PDSCH, reception; and
   determine a scheduling offset for a PDSCH or a PUSCH based on a time location of a PDCCH candidate of the repetition set.

13. The method of claim 12, further comprising combining the multiple received PDCCH message transmissions in the repetition set to determine the PDCCH candidate.

14. The method of claim 12, wherein each PDCCH message transmission is separately decodable to produce the PDCCH candidate.

15. The method of claim 13, further comprising searching multiple search spaces where there is a repetition association between different search spaces, and wherein the PDCCH candidate in a search space is repeated in another search space to achieve the repetition set.

16. The method of claim 12, further comprising searching for a first PDCCH candidate in a first search space, the first PDCCH candidate having a first downlink control information, DCI, there being a corresponding PDCCH candidate in another search space having a same sized DCI as the first PDCCH candidate.

17. The method of claim 16, further comprising combining PDCCH candidates from multiple search spaces to obtain PDCCH detection robustness.

18. The method of claim 12, further comprising searching for a PDCCH candidate based on multiple identifiers in a search space configuration, the multiple identifiers indicating multiple PDCCH candidates.

19. A network configured to communicate with a wireless device WD, the network node comprising processing circuitry configured to:
   configure a physical downlink control channel, PDCCH, message for multiple transmissions; and
   cause the multiple transmissions of the PDCCH message, each of the multiple transmissions of the PDCCH message being repeated in a repetition set, the multiple transmission causing the WD to monitor the multiple transmissions of the PDCCH message to obtain scheduling information for one of a physical uplink shared channel, PUSCH, transmission and a physical downlink shared channel, PDSCH, reception by the WD and determine a scheduling offset for a PDSCH or a PUSCH based on a time location of a PDCCH candidate of the repetition set.

20. The network node of claim 19, wherein the processing circuitry is further configured to configure the PDCCH message with an identifier of at least another PDCCH that includes the same message.

21. The network node of claim 19, wherein the processing circuitry is further configured to cause transmission of a PDCCH candidate message with a first aggregation level in a first control resource set, CORESET, and to map the PDCCH mapped to another PDCCH candidate message transmitted with a second aggregation level in a second CORESET.

22. The network node of claim 19, wherein first and second candidate PDCCHs convey a same downlink control information.

23. The network node of claim 19, wherein different PDCCH candidates are transmitted by different network nodes.

24. A method implemented in a network node, the network node being configured to communicate with a wireless device, WD, the method comprising:

configuring a physical downlink control channel, PDCCH, message for multiple transmissions; and causing the multiple transmissions of the PDCCH message, each of the multiple transmissions of the PDCCH message being repeated in a repetition set, the multiple transmission causing the WD to monitor the multiple transmissions of the PDCCH message to obtain scheduling information for one of a physical uplink shared channel, PUSCH, transmission and a physical downlink shared channel, PDSCH, reception by the WD and determine a scheduling offset for a PDSCH or a PUSCH based on a time location of a PDCCH candidate of the repetition set.

\* \* \* \* \*